United States Patent
Fahland et al.

(10) Patent No.: US 10,029,746 B2
(45) Date of Patent: Jul. 24, 2018

(54) DOWNFORCE GENERATING DUCT FOR A VEHICLE

(71) Applicant: GM GLOBAL TECHNOLOGY OPERATIONS LLC, Detroit, MI (US)

(72) Inventors: Jason D. Fahland, Fenton, MI (US); Joshua R. Auden, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 69 days.

(21) Appl. No.: 15/380,209

(22) Filed: Dec. 15, 2016

(65) Prior Publication Data

US 2018/0170457 A1    Jun. 21, 2018

(51) Int. Cl.
*B62D 35/02* (2006.01)
*B62D 37/02* (2006.01)
*F15D 1/00* (2006.01)

(52) U.S. Cl.
CPC ............. *B62D 37/02* (2013.01); *B62D 35/02* (2013.01); *F15D 1/0025* (2013.01)

(58) Field of Classification Search
CPC ...... B62D 37/02; B62D 35/005; B62D 35/02; F15D 1/0025

USPC .................................................. 296/187.09
See application file for complete search history.

(56) References Cited

U.S. PATENT DOCUMENTS

| | | | | |
|---|---|---|---|---|
| 4,569,551 | A * | 2/1986 | Rauser | B62D 35/02 296/180.1 |
| 5,322,340 | A * | 6/1994 | Sato | B62D 25/20 180/68.1 |
| 6,575,522 | B2 * | 6/2003 | Borghi | B62D 35/005 296/180.1 |
| 8,731,781 | B2 * | 5/2014 | Prentice | B62D 35/02 296/180.1 |

\* cited by examiner

*Primary Examiner* — Pinel E Romain
(74) *Attorney, Agent, or Firm* — Quinn IP Law

(57) ABSTRACT

A duct is configured for a vehicle having a vehicle body arranged along a longitudinal body axis. The vehicle body includes a first vehicle body end configured to face oncoming ambient airflow when the vehicle is in motion, a second vehicle body end opposite of the first vehicle body end. The duct has a fully-enclosed structure in a cross-sectional view perpendicular to the longitudinal body axis. The duct also has a first port positioned to receive a portion of the oncoming airflow and a second port positioned to exhaust the portion of the oncoming airflow from the duct. The first and second ports together with the fully-enclosed structure are configured to generate an aerodynamic downforce on the vehicle body when the vehicle is in motion.

20 Claims, 3 Drawing Sheets

DOWNFORCE GENERATING DUCT FOR A VEHICLE

TECHNICAL FIELD

The disclosure relates to a downforce generating duct for a vehicle.

BACKGROUND

Aerodynamics is a study of objects moving through air and is a significant factor in vehicle design, including automobiles. Automotive aerodynamics is the study of the aerodynamics of road vehicles. The main goals of the study are reducing vehicle drag and wind noise, minimizing noise emission, as well as preventing undesired lift forces and other causes of aerodynamic instability during cornering and at high speeds via management of airflow. The study is typically used to shape vehicle bodywork and add-on aerodynamic devices for achieving a desired compromise among the above characteristics for specific vehicle use.

Additionally, the study of aerodynamics may be used to achieve downforce in high-performance vehicles in order to improve vehicle traction and cornering abilities. The study is typically used to shape vehicle bodywork for achieving a desired compromise among the above characteristics for specific vehicle use. Downforce is a downwards thrust created by the aerodynamic characteristics of a vehicle. The purpose of downforce is to increase the vertical force on the tires to create more road grip, thus allowing a car to travel faster through a corner. Road-going passenger cars, as well as racecars, can benefit from increased downforce. Downforce on a vehicle body is frequently achieved through use of various devices, such as air-dams and diffusers.

SUMMARY

A duct is configured for a vehicle having a vehicle body arranged along a longitudinal body axis. The vehicle body includes a first vehicle body end configured to face oncoming ambient airflow when the vehicle is in motion, and a second vehicle body end opposite of the first vehicle body end. The vehicle body also includes a vehicle top body section and vehicle underbody section. The duct defines a fully-enclosed structure in a cross-sectional view perpendicular to the longitudinal body axis. The duct also includes a first or entry port positioned to receive a portion of the oncoming ambient airflow and a second or exit port positioned to exhaust the portion of the oncoming ambient airflow from the duct. The first and second ports together with the fully-enclosed structure are configured to generate an aerodynamic downforce on the vehicle body when the vehicle is in motion.

The duct can also include a venturi configured to accelerate the portion of the oncoming ambient airflow when the vehicle is in motion. The venturi can be arranged on the duct between the first port and the second port, intermediate the first vehicle body and the second vehicle body end. The venturi can be defined by a narrow section in at least one of a height and a width dimension of the duct.

The duct can be configured to be mounted to the vehicle body via a plurality of fasteners. For such a purpose, the duct defines at least one aperture configured to accept a respective mounting fastener.

The duct may define a plurality of parallel conduits configured to extend longitudinally relative to the vehicle body. Each of the plurality of parallel conduits may have individual first and second ports. Additionally, each conduit may have a fully-enclosed structure in a cross-sectional view.

The duct may be arranged on the vehicle underbody section and configured to direct the portion of the oncoming airflow along the vehicle underbody section to the ambient at the second vehicle body end.

The vehicle may also include an internal combustion engine connected to an exhaust system configured to route a flow of exhaust gas from the engine to the ambient. In such a case, the duct may be configured to accommodate the exhaust system such that the exhaust system extends along the longitudinal body axis through the duct.

The first port may be configured to be positioned proximate the first vehicle body end and the second port may be configured to be positioned proximate the second vehicle body end.

The duct can be arranged on the vehicle top body section and configured to direct the portion of the oncoming airflow along the vehicle top body section to the ambient at the second vehicle body end.

Each of the first and second ports can have an oblong, such as oval or rectangular, shape. In such a case, a width of the duct can be greater than the duct height.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
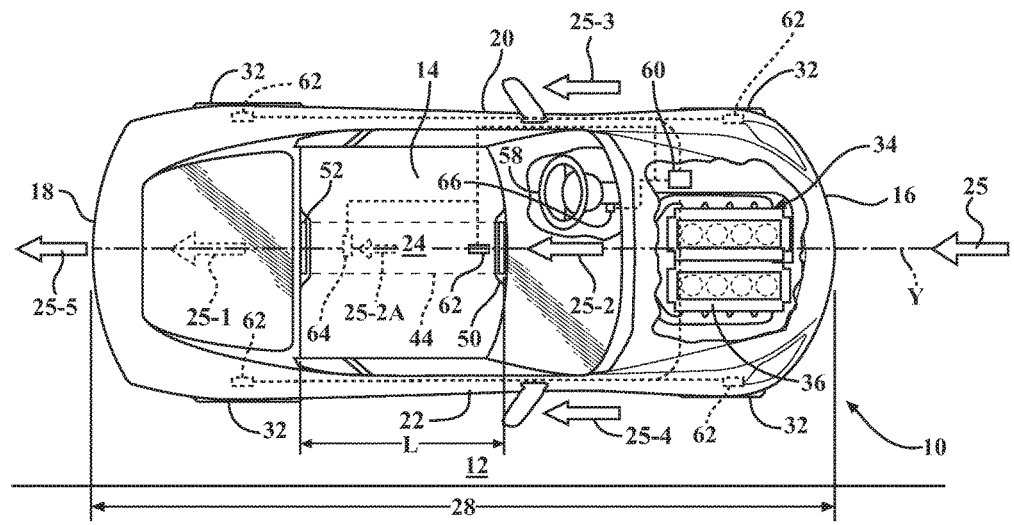
FIG. 1 is a schematic top view of a vehicle having a duct, shown in phantom, arranged on a vehicle top body section along a vehicle longitudinal axis, according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 having a longitudinal Y-axis. The vehicle body 14 defines six body sides. The six body sides include a first body end or front end 16, an opposing second body end or rear end 18, a left side 20, and a right side 22, a top body section 24, which frequently includes a vehicle roof, and an underbody section 26 (shown in FIG. 2). As shown, the top body section 24 is configured to span a distance 28 between the front and rear ends 16, 18 of the body 14. As understood by those skilled in the art, the front end 16 is configured to face oncoming or incident ambient airflow 25 when the vehicle is in motion relative to the road surface 12.

Figure 2:
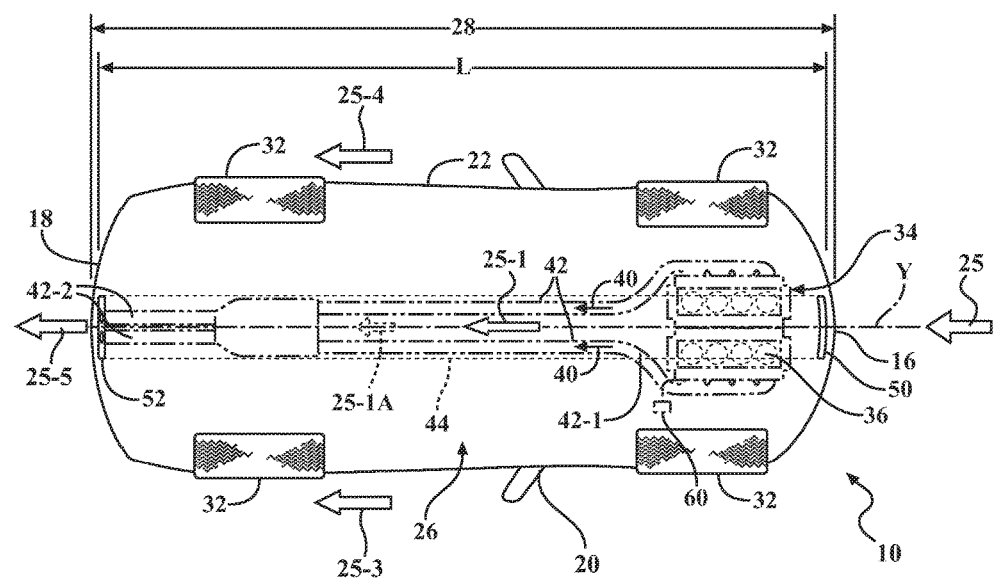
FIG. 2 is a schematic bottom view of the vehicle having a duct, shown in phantom, arranged on a vehicle underbody section along the vehicle longitudinal axis, according to the disclosure.
Figure 3:
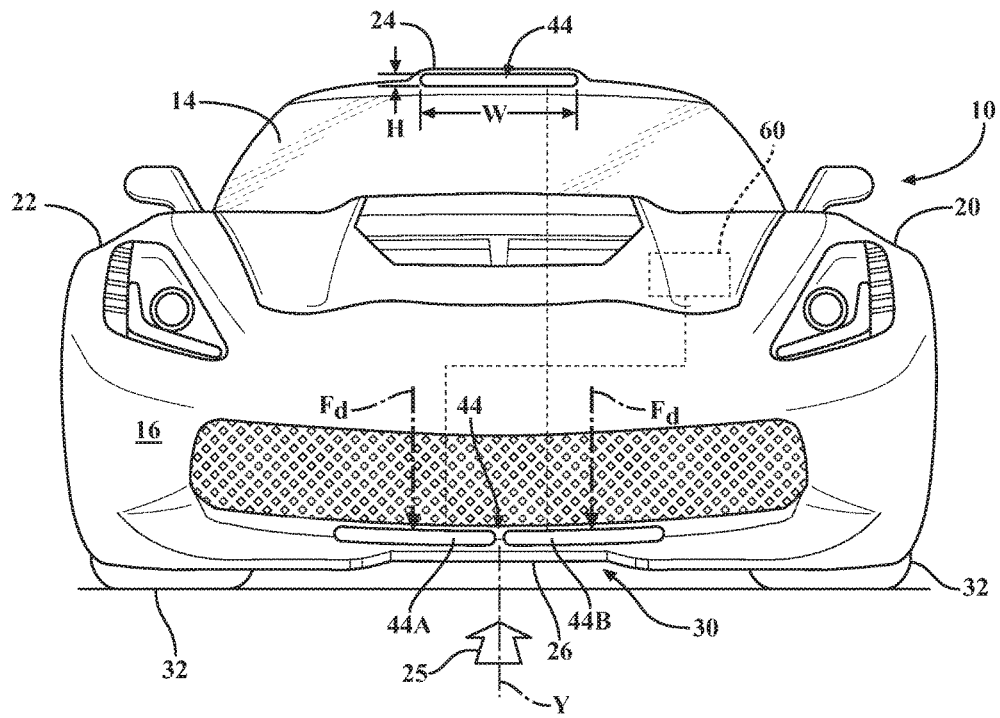
FIG. 3 is a schematic close-up front view of the duct shown in FIGS. 1 and 2, according to the disclosure.

As shown in FIG. 2, and similar to the top body section 24, the underbody section 26 is configured to span the distance 28 between the front and rear ends 16, 18 of the body 14. The underbody section 26 may have a substantially flat surface and have components of various sub-systems, such as an engine exhaust system and a vehicle suspension (not shown), tucked into specially configured crevices, such that a first airflow portion 25-1 may flow past the vehicle body 14 with limited disturbance. The underbody section 26 also defines a space 30 between the vehicle body 14 and the road surface 12 (as shown in FIG. 3). Accordingly, the space 30 permits the first or underbody airflow portion 25-1 to pass under the vehicle body 14, between the vehicle body 14 and the road surface 12, while a second or top airflow portion 25-2 passes over the top body section 24. Furthermore, a third airflow portion 25-3 passes around the left side 20 and a fourth airflow portion 25-4 passes around the right side 22. The airflow portions 25-1, 25-2, 25-3, and 25-4 all rejoin behind the rear end 18 in a wake area or recirculating airflow region 25-5 immediately behind the rear end 18 of the moving vehicle. As understood by those skilled in the art, the recirculating airflow region 25-5 is generally caused at elevated vehicle speeds by the flow of surrounding air around the body sides 18, 20, 22, 24, and 26.

As shown in FIGS. 2 and 3, the vehicle 10 includes a plurality of road wheels 32 and a powertrain 34 having an internal combustion engine 36 for generating engine torque. The powertrain 34 can also include a transmission (not shown) operatively connecting the engine 36 to at least some of the road wheels 32 for transmitting engine torque thereto. The engine 36 generates a flow of exhaust gas 40 as a byproduct of the combustion and discharges the flow of exhaust gas to an exhaust system 42 extending along the underbody section 26 (shown in FIGS. 2 and 5). The exhaust system 42 is, in turn, configured to route a flow of the exhaust gas 40 to the ambient. The exhaust system 42 includes an inlet 42-1 configured to receive the flow of exhaust gas 40 from the engine 36, and an outlet 42-2 configured to discharge the flow of exhaust gas to the ambient.

The vehicle 10 also includes a duct 44. The duct 44 is arranged on the vehicle body 14 along the longitudinal body axis Y. The duct 44 is configured to generate an aerodynamic downforce $F_D$ on the vehicle body 14 when the vehicle 10 is in motion. The duct 44 can be defined by the vehicle body 14, as an integral part of the vehicle body structure, or be configured as a subassembly for attachment thereto. In the embodiment of the duct 44 configured as a subassembly, the duct can define apertures 45 (shown in FIG. 5) configured to accept appropriate fasteners 46 for mounting the duct to the vehicle body 14, or be attached to the vehicle body via an adhesive or a weld (not shown). The duct 44 can be arranged on the top body section 24 (shown in FIG. 1). Alternatively, the duct 44 can be arranged on the underbody section 26 (shown in FIG. 2). The duct 44 arranged on the underbody section 26 is configured to direct the respective underbody airflow portion 25-1 along the underbody section, while the duct arranged on the top body section 24 is configured to direct the respective top airflow portion 25-2 along the top body section. The duct 44 has a duct length L (shown in FIGS. 1, 2, and 5) that can be configured to span a part of either the top body section 24 or the underbody section 26, or to span substantially the entire distance 28 between the front and rear ends 16, 18 of the body 14. As shown in FIG. 2, the duct 44 can be configured to accommodate the exhaust system 42, such that the exhaust system extends along the longitudinal body axis Y through the duct.

Figure 4:
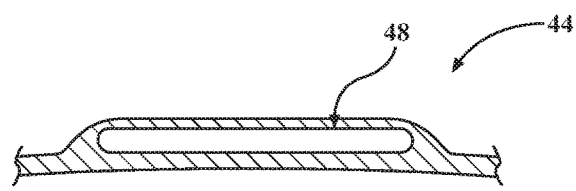
FIG. 4 is a schematic cross-sectional front view of an embodiment of the duct, according to the disclosure.

FIG. 4 shows a front view of a cross-section of the duct 44. The cross-section of the duct 44 is characterized by a fully-enclosed structure 48 in a cross-sectional view perpendicular to the longitudinal body axis Y. Such fully-enclosed structure 48 of the duct 44 is configured to span the entire duct length L. As shown in FIGS. 1 and 2, either embodiment of the duct 44 includes a first or airflow entry port 50 and a second or airflow discharge port 52. In the two separate embodiments of the duct 44, the entry port 50 is configured to receive either the underbody airflow portion 25-1 or top airflow portion 25-2 of the incident ambient airflow 25 and the exit port 52 is configured to discharge the respective airflow portion to the ambient in the recirculating airflow region 25-5. The airflow entry port 50 can be positioned proximate the front end 16, while the airflow discharge port 52 can be positioned proximate the rear end 18. Each of the airflow entry and discharge ports 50, 52 can have an oblong, such as an oval or a rectangular, shape, wherein a width W of the duct 44 is greater its height H to tailor characteristics of the airflow through the duct as desired for a specific vehicle application.

According to the disclosure, the airflow entry and discharge ports 50, 52 and the fully-enclosed structure 48 are together configured to generate the aerodynamic downforce $F_D$ on the vehicle body 14 when the vehicle 10 is in motion. As shown in FIG. 2, either the top of the body 24 or the underbody 26 embodiment of the duct 44 can also define a plurality of individual parallel conduits arranged longitudinally relative to the vehicle body 14. Although the plurality of individual parallel conduits is specifically depicted as two conduits 44A and 44B, the number of conduits can be greater. Furthermore, each of the plurality of parallel conduits, such as the conduits 44A and 44B, can include individual entry and discharge ports 50 and 52.

Overall, the duct 44 works by accelerating the velocity of the underbody airflow portion 25-1 relative to the vehicle body 14. The duct 44 uses the Bernoulli principle, according to which fluid pressure decreases as velocity of the fluid increases. As such, the duct 44 causes the pressure below the vehicle 10, i.e., in the space 30 between the vehicle body 14 and the road surface 12, to be lower than on the left, right, and top body sections 20, 22, and 24 of the vehicle body 14, thereby generating a measure of downforce $F_D$ on the vehicle body. Generally, because the downforce $F_D$ is a function of the flow of air over and under the vehicle 10, i.e., the second airflow portion 25-2 and the underbody airflow portion 25-1, respectively, and because aerodynamic forces increase with the square of velocity, the downforce increases with the square of the vehicle's speed and requires a certain minimum speed in order to produce a significant effect.

Figure 5:
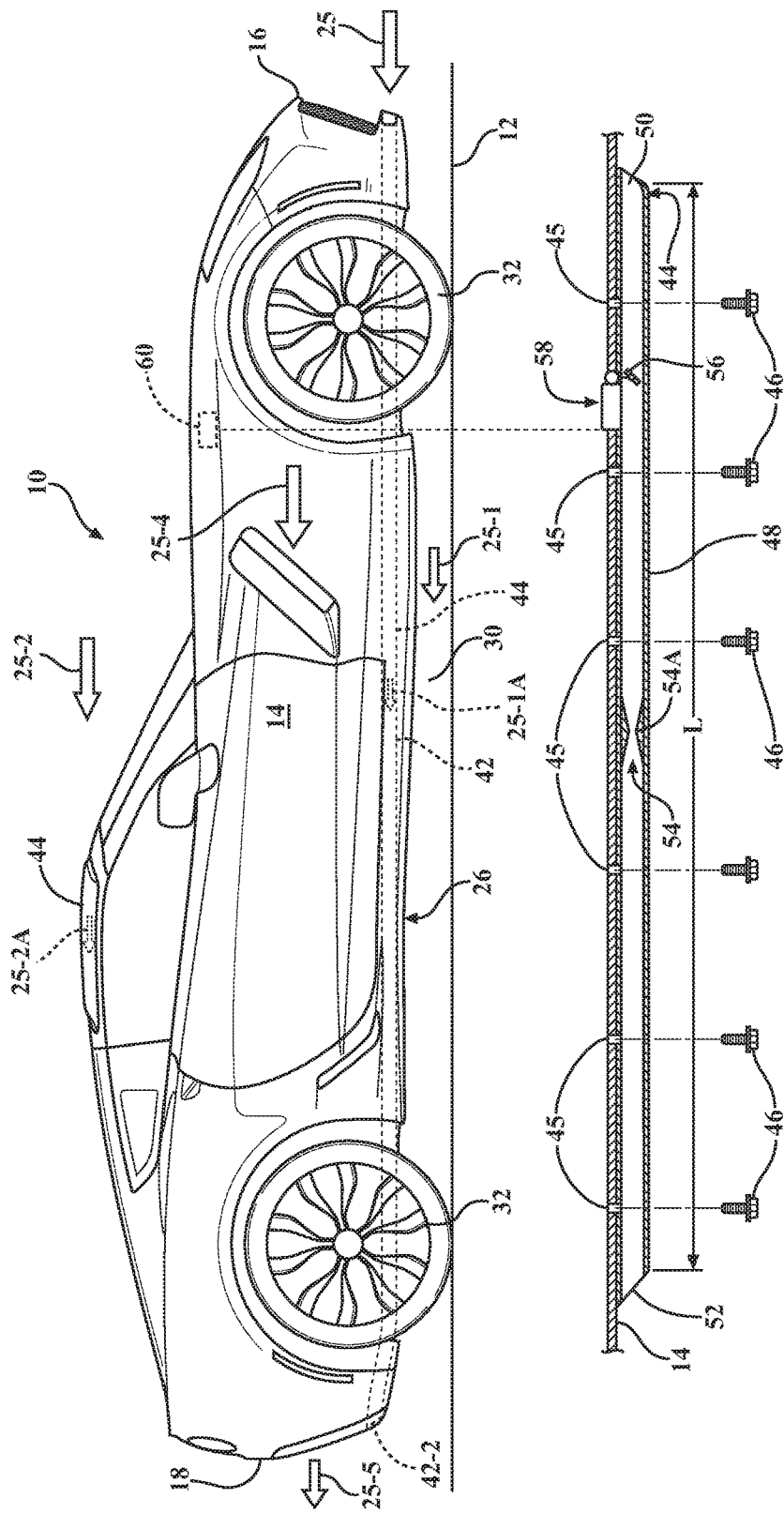
FIG. 5 is a schematic close-up partially cross-sectional partially exploded side view of an embodiment of the duct, according to the disclosure.

Specifically, the duct 44 arranged on the underbody section 26 will divert some of the underbody airflow 25-1, such as a portion 25-1A (shown in FIGS. 2 and 5), while the duct arranged on the top body section 24 will divert some of the underbody airflow 25-2, such as a portion 25-2A (shown in FIGS. 1 and 5). Thus, whether in the case of the duct 44 being arranged on the underbody section 26 or on the top body section 24, the duct is intended to reduce the pressure in the space 30 between the vehicle body 14 and the road surface 12. Such a reduction in pressure under the vehicle body 14 in turn increases the pressure differential in favor of the pressure acting down on the vehicle body, i.e., increasing the aerodynamic downforce $F_D$. Also, in either embodiment of the duct 44 the velocity of the underbody airflow 25-1 passing through the space 30 between the vehicle body 14 and the road surface 12 is increased because an exit path for the airflow becomes more efficient as compared with the usual path through the space 30 and/or out the sides 20, 22 to the recirculating airflow region 25-5. Therefore, the downforce $F_D$, especially at the front end 16, is increased in this manner as well. Typically, as the downforce $F_D$ is increased on the vehicle body 14, the aerodynamic drag on the vehicle also increases. However, the airflow exiting the duct 44 reduces the recirculating airflow region 25-5, i.e., the wake area immediately behind the vehicle 10, thus reducing drag. Therefore, the use of the duct 44 improves, i.e., increases, the downforce $F_D$/drag ratio due to enhanced aerodynamic efficiency of the vehicle body 14.

As shown in a partially exploded cross-sectional side view of the duct 44 in FIG. 5, the duct 44 can additionally include a venturi 54 arranged between the airflow entry port 50 and the airflow discharge port 52. As understood by those skilled in the art, a venturi, a.k.a., a venturi tube, is a device that operates according to the principle of the "Venturi Effect". The Venturi effect is the reduction in fluid pressure that results when a fluid flows through a constricted section of a pipe. In fluid dynamics, a fluid's velocity must increase as it passes through a constriction in accord with the principle of continuity, while its static pressure must decrease in accord with the principle of conservation of mechanical energy. Thus any gain in kinetic energy a fluid may accrue due to its increased velocity through a constriction is balanced by a drop in pressure.

The venturi 54 arranged within the duct 44 is intended to accelerate the respective top airflow portion 25-2 or underbody airflow portion 25-1 of the incident ambient airflow 25 when the vehicle 10 is in motion. The structure of the duct 44 can define the venturi 54, or the venturi can be a separate subassembly positioned and secured within the duct. The venturi 54 can be defined by a narrowed section 54A in either a height H or a width W dimension of the duct 44, or the narrowed section 54A can be defined in each of the height and width (as shown in FIG. 5). In the embodiment where the duct 44 includes a plurality of individual parallel conduits, such as 44A and 44B shown in FIG. 2, each of such parallel conduits can include a respective venturi 54.

As additionally shown in FIG. 5, the vehicle 10 may additionally include a valve 56 arranged either at the airflow entry port 50, at the airflow discharge port 52, or inside the duct 44 between the entry and discharge ports. The valve 56 is configured to control passage of respective top airflow portion 25-2 or underbody airflow portion 25-1 through the duct 44. The valve 56 can be a binary type, on-off shutter for the duct 44 or a progressively controlled device configured to gradually restrict or open the duct to permit passage of the respective top airflow portion 25-2 or underbody airflow portion 25-1. The valve 56 can be operated by a suitable mechanism 58 configured to select a position for the valve 56 between and inclusive of fully-opened and fully-closed. The mechanism 58 can, for example, include a linear actuator and/or an electric motor (shown in FIG. 5). Although not shown, the mechanism 58 can also include a gear drive, such as a reduction gear-set, to affect desired movement of the valve 56.

Specifically, the mechanism 58 can be configured to selectively restrict or open the valve 56 to vary a magnitude of downforce $F_D$ generated by the duct 44. Accordingly, the valve 56 in a more restricted state permits less of the respective top airflow portion 25-2 or underbody airflow portion 25-1 to pass through the duct 44 to decrease the magnitude of downforce $F_D$ generated by the duct. Conversely, a less restricted state valve 56 permits more of the respective top airflow portion 25-2 or underbody airflow portion 25-1 to pass through the duct 44 to decrease the magnitude of downforce $F_D$ generated by the duct. In the embodiment where the duct 44 includes a plurality of individual parallel conduits, shown as 44A and 44B in FIG. 2, each of such parallel conduits can include a respective valve 56 and an attendant mechanism 58 for each of the valves. The plurality of individual parallel conduits 44A and 44B, the venturi 54, and/or the valve 56 can be employed in either the top of the body 24 or the underbody 26 embodiment of the duct 44.

As shown in FIGS. 1-3 and 5, the vehicle 10 can also include an electronic controller 60 configured, i.e., constructed and programmed, to regulate the mechanism 58. The controller 60 may be configured as a central processing unit (CPU) intended to regulate operation of the internal combustion engine 36, as well as other vehicle systems, or a dedicated controller. In order to appropriately control operation of the mechanism 58, the controller 60 can include a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 60 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 60 may also include a floppy disk, a flexible disk, hard disk, magnetic tape, any other magnetic medium, a CD-ROM, DVD, any other optical medium, etc. The controller 60 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 60 or accessible thereby may be stored in the memory and automatically executed to provide the required functionality.

With renewed reference to FIG. 1, the vehicle 10 may also include at least one first sensor 62 arranged on the vehicle body 14, in communication with the controller 60, and configured to detect vehicle dynamic parameter. An example of such vehicle dynamic parameter can be a road speed of the vehicle 10. The sensor(s) 62 can be configured to detect the road speed of the vehicle 10 and communicate thus detected road speed to the controller 60. The first sensor 62 may actually include a plurality of such sensors arranged on the vehicle body 14 for detecting rotating speeds of each road wheel 32 (shown in FIG. 1). Each such first sensor 62 may also be configured to communicate the detected rotating speed of the respective road wheel 32 to the controller 60, while the controller may be configured to correlate the signals received from the respective first sensors to the road speed of vehicle 10. Alternatively, the first sensor 62 may be a pitot tube configured to detect a velocity of the incident ambient airflow 25 at a specific location relative to the vehicle body 14, and the controller 60 can correlate the detected velocity of the ambient airflow to the road speed of vehicle 10.

Similarly, a second sensor 64 can be provided to detect another vehicle dynamic parameter, such as a rate of the yaw of the vehicle body 14 and communicate the detected yaw rate to the controller 60. Additionally, one or more third sensors 66, for example an accelerometer configured to detect longitudinal forces, such as encountered during acceleration or braking maneuvers, and/or an accelerometer configured to detect lateral g-forces acting on the vehicle 10, can be used to communicate such feedback parameters to the controller 60 for regulation of the valve 56 via the mechanism 58. For example, the controller 60 can be configured to vary the position of the valve 56 to affect the magnitude of downforce $F_D$ generated by the duct 44 during cornering of the vehicle 10 in response to the yaw rate detected by the second sensor 64 and/or the lateral and the longitudinal g-forces detected by the third sensor(s) 66. Furthermore, the controller 60 can be configured to vary the position of the valve 56 in response to the rotating speeds of the road wheels 32 and/or the velocity of the ambient airflow 27 detected via the specific embodiment of the first sensor 62.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
 a vehicle body arranged along a longitudinal body axis and including a first vehicle body end configured to face oncoming ambient airflow and a second vehicle body end opposite of the first vehicle body end; and
 a duct arranged on the vehicle body along the longitudinal body axis and configured to generate an aerodynamic downforce on the vehicle body when the vehicle is in motion, the duct having:
  a fully-enclosed structure in a cross-sectional view perpendicular to the longitudinal body axis;
  a first port positioned to receive a portion of the oncoming ambient airflow; and
  a second port positioned to exhaust the portion of the oncoming ambient airflow from the duct;
 wherein the first and second ports and the fully-enclosed structure are together configured to generate the aerodynamic downforce on the vehicle body when the vehicle is in motion.

2. The vehicle of claim 1, wherein the duct additionally includes a venturi arranged between the first port and the second port and configured to accelerate the portion of the oncoming ambient airflow when the vehicle is in motion.

3. The vehicle of claim 1, further comprising a valve configured to control passage of the portion of the oncoming ambient airflow through the duct.

4. The vehicle of claim 1, wherein the duct is defined by the vehicle body.

5. The vehicle of claim 1, wherein the duct defines an aperture configured to accept a fastener for mounting the duct to the vehicle body.

6. The vehicle of claim 1, wherein the duct defines a plurality of parallel conduits arranged longitudinally relative to the vehicle body.

7. The vehicle of claim 1, wherein the vehicle body includes a vehicle underbody section, and wherein the duct is arranged on the vehicle underbody section and configured to direct the portion of the oncoming airflow along the vehicle underbody section to the ambient at the second vehicle body end.

8. The vehicle of claim 7, further comprising an internal combustion engine connected to an exhaust system configured to route a flow of exhaust gas from the engine to the ambient, and wherein the duct is configured to accommodate the exhaust system such that the exhaust system extends along the longitudinal body axis through the duct.

9. The vehicle of claim 1, wherein the first port is positioned proximate the first vehicle body end and the second port is positioned proximate the second vehicle body end.

10. The vehicle of claim 1, wherein the vehicle body includes a vehicle top body section, and wherein the duct is arranged on the vehicle top body section and configured to direct the portion of the oncoming airflow along the underbody section to the ambient at the second vehicle body end.

11. A duct configured for a vehicle having a vehicle body arranged along a longitudinal body axis and including a first vehicle body end configured to face oncoming ambient airflow when the vehicle is in motion and a second vehicle body end opposite of the first vehicle body end, the duct comprising:
 a fully-enclosed structure in a cross-sectional view perpendicular to the longitudinal body axis;
 a first port positioned to receive a portion of the oncoming ambient airflow; and
 a second port positioned to exhaust the portion of the oncoming ambient airflow from the duct;
 wherein:
  the duct is configured to be arranged on the vehicle body along the longitudinal body axis; and
  the first and second ports and the fully-enclosed structure are together configured to generate an aerodynamic downforce on the vehicle body when the vehicle is in motion.

12. The duct of claim 11, further comprising a venturi arranged between the first port and the second port and configured to accelerate the portion of the oncoming ambient airflow when the vehicle is in motion.

13. The duct of claim 11, wherein the duct is defined by the vehicle body.

14. The duct of claim 11, wherein the duct defines an aperture configured to accept a fastener for mounting the duct to the vehicle body.

15. The duct of claim 11, wherein the duct defines a plurality of parallel conduits configured to extend longitudinally relative to the vehicle body.

16. The duct of claim 11, wherein the vehicle body includes a vehicle underbody section, and wherein the duct is configured to be arranged on the vehicle underbody section and configured to direct the portion of the oncoming airflow along the vehicle underbody section to the ambient at the second vehicle body end.

17. The duct of claim 16, wherein the vehicle additionally includes an internal combustion engine connected to an exhaust system configured to route a flow of exhaust gas from the engine to the ambient, and wherein the duct is configured to accommodate the exhaust system such that the exhaust system extends along the longitudinal body axis through the duct.

18. The duct of claim 11, wherein the first port is configured to be positioned proximate the first vehicle body end and the second port is configured to be positioned proximate the second vehicle body end.

19. The duct of claim 11, wherein the vehicle body includes a vehicle top body section, and wherein the duct is configured to be arranged on the vehicle top body section and configured to direct the portion of the oncoming airflow along the underbody section to the ambient at the second vehicle body end.

20. The duct of claim 11, wherein each of the first and second ports has an oblong shape.

* * * * *